United States Patent
Bonilla et al.

(10) Patent No.: US 12,512,685 B2
(45) Date of Patent: Dec. 30, 2025

(54) DISTRIBUTED CHARGING STATION

(71) Applicant: Hubbell Incorporated, Shelton, CT (US)

(72) Inventors: Nelson Bonilla, Shelton, CT (US); Jason Walker, Bethany, CT (US); John Brower, Fairfield, CT (US); Matthew Samojeden, Rye, NY (US); Shadi AbuGhazaleh, Guilford, CT (US); Nicole Gay, Thomaston, CT (US)

(73) Assignee: Hubbell Incorporated, Shelton, CT (US)

( * ) Notice: Subject to any disclaimer, the term of this patent is extended or adjusted under 35 U.S.C. 154(b) by 13 days.

(21) Appl. No.: 17/728,008

(22) Filed: Apr. 25, 2022

(65) Prior Publication Data

US 2022/0255325 A1    Aug. 11, 2022

Related U.S. Application Data

(63) Continuation of application No. 16/288,798, filed on Feb. 28, 2019, now Pat. No. 11,316,353.
(Continued)

(51) Int. Cl.
*H02J 7/00* (2006.01)
*H02J 13/00* (2006.01)
(Continued)

(52) U.S. Cl.
CPC ........ *H02J 7/0045* (2013.01); *H02J 7/00036* (2020.01); *H02J 7/00038* (2020.01);
(Continued)

(58) Field of Classification Search
CPC .................................................... H02J 7/0045
See application file for complete search history.

(56) References Cited

U.S. PATENT DOCUMENTS

| 6,326,767 B1 | 12/2001 | Small et al. |
| D456,085 S | 4/2002 | O'Brien |

(Continued)

FOREIGN PATENT DOCUMENTS

| CN | 103226184 A | 7/2013 |
| CN | 203205893 U | 9/2013 |

(Continued)

OTHER PUBLICATIONS

PCT/US2018/039507 International Search Report and Written Opinion dated Oct. 2, 2018 (18 pages).
(Continued)

*Primary Examiner* — Robert Grant
(74) *Attorney, Agent, or Firm* — Michael Best & Friedrich LLP

(57) ABSTRACT

A device charging system including a battery configured to supply a type of power to at least one load device and a central charging station configured to receive the battery The central charging station including a locking mechanism configured to secure the battery to the central charging station, an output port configured to supply power to the battery, and an electronic processor. The electronic processor configured to: receive an unlock command from at least one selected from a group consisting of a remote device and a user-interface of the central charging station, and disengage the locking mechanism upon receiving the unlock command.

14 Claims, 7 Drawing Sheets

Related U.S. Application Data

(60) Provisional application No. 62/702,511, filed on Jul. 24, 2018, provisional application No. 62/636,454, filed on Feb. 28, 2018, provisional application No. 62/636,469, filed on Feb. 28, 2018.

(51) Int. Cl.
  *H02J 50/10* (2016.01)
  *H02J 50/90* (2016.01)
  *H01M 10/42* (2006.01)

(52) U.S. Cl.
  CPC .......... *H02J 7/0013* (2013.01); *H02J 7/0047* (2013.01); *H02J 7/007* (2013.01); *H02J 13/00001* (2020.01); *H02J 50/10* (2016.02); *H02J 50/90* (2016.02); *H01M 10/4257* (2013.01); *H02J 7/0048* (2020.01)

(56) References Cited

U.S. PATENT DOCUMENTS

| | | | |
|---|---|---|---|
| D654,019 S | 2/2012 | Ikegame | |
| 8,310,201 B1 | 11/2012 | Wright | |
| D680,066 S | 4/2013 | Kinoshita | |
| D710,797 S | 8/2014 | Awiszus | |
| D722,957 S | 2/2015 | Kotaniemi | |
| D736,703 S | 8/2015 | Kotaniemi | |
| D755,122 S | 5/2016 | Gecawicz | |
| D761,729 S | 7/2016 | Leong | |
| D801,920 S | 11/2017 | Yoon | |
| D805,030 S | 12/2017 | Massar | |
| D823,792 S | 7/2018 | Komoni | |
| D860,132 S | 9/2019 | Fu | |
| D866,460 S | 11/2019 | Komoni | |
| 11,316,353 B2 | 4/2022 | Bonilla et al. | |
| 2005/0110639 A1 | 5/2005 | Puzio et al. | |
| 2010/0259213 A1 | 10/2010 | Maharaj | |
| 2011/0121790 A1 | 5/2011 | Brandon, II | |
| 2011/0145086 A1 | 6/2011 | Valdes et al. | |
| 2011/0234153 A1 | 9/2011 | Abramson | |
| 2012/0249051 A1 | 10/2012 | Son et al. | |
| 2013/0026981 A1* | 1/2013 | Van Der Lee | H02J 50/10 320/108 |
| 2013/0274920 A1 | 10/2013 | Abramson et al. | |
| 2013/0279206 A1 | 10/2013 | Yang | |
| 2013/0328522 A1 | 12/2013 | Brockman et al. | |
| 2014/0053620 A1 | 2/2014 | Taylor et al. | |
| 2015/0123598 A1 | 5/2015 | Tew et al. | |
| 2015/0326061 A1 | 11/2015 | Davison et al. | |
| 2015/0357084 A1 | 12/2015 | Willget et al. | |
| 2015/0357684 A1* | 12/2015 | Willgert | H01M 50/213 320/112 |
| 2015/0364945 A1* | 12/2015 | Miller | H01M 50/24 320/108 |
| 2015/0372520 A1 | 12/2015 | Fiebrich et al. | |
| 2016/0088482 A1* | 3/2016 | Zeiler | B25F 5/00 455/426.1 |
| 2016/0099590 A1* | 4/2016 | Velderman | G07F 7/06 320/113 |
| 2016/0156207 A1 | 6/2016 | Frankenberger | |
| 2017/0070067 A1 | 3/2017 | Suzuki et al. | |
| 2018/0030759 A1* | 2/2018 | Chanbonpin | E05B 65/0007 |
| 2018/0375349 A1 | 12/2018 | Bonilla et al. | |

FOREIGN PATENT DOCUMENTS

| | | |
|---|---|---|
| CN | 103853672 A | 6/2014 |
| CN | 106056777 A | 10/2016 |
| CN | 106182009 A | 12/2016 |
| CN | 106204938 A | 12/2016 |
| CN | 205827534 A | 12/2016 |
| CN | 205862456 A | 1/2017 |
| CN | 205915343 A | 2/2017 |
| CN | 107301733 A | 10/2017 |
| CN | 107393177 A | 11/2017 |
| CN | 107437836 A | 12/2017 |
| EP | 926798 A1 | 6/1999 |
| EP | 3759793 A4 | 1/2022 |
| WO | 20190169109 A1 | 9/2019 |

OTHER PUBLICATIONS

Canadian Patent Application No. 3,092,263 Office Action dated Apr. 25, 2025 (5 pages).

* cited by examiner

DISTRIBUTED CHARGING STATION

RELATED APPLICATIONS

This application claims the benefit to U.S. patent application Ser. No. 16/288,798, filed Feb. 28, 2019, which claims priority to U.S. Provisional Patent Application No. 62/636,454, filed on Feb. 28, 2018, U.S. Provisional Patent Application No. 62/636,469, filed on Feb. 28, 2018, and U.S. Provisional Patent Application No. 62/702,511, filed on Jul. 24, 2018, the entire contents all of which are incorporated herein by reference.

FIELD

Embodiments relate to portable power supplies.

SUMMARY

Portable power supplies (for example, battery charging modules, mobile power modules, etc.) may need to be kept within proximity of a central device to ensure that they do not get lost or stolen.

Accordingly, the embodiments provide a device charging system including a battery configured to supply a type of power to at least one load device and a central charging station configured to receive the battery The central charging station including a locking mechanism configured to secure the battery to the central charging station, an output port configured to supply power to the battery, and an electronic processor. The electronic processor configured to: receive an unlock command from at least one selected from a group consisting of a remote device and a user-interface of the central charging station, and disengage the locking mechanism upon receiving the unlock command.

Other embodiments provide a method of managing a battery having one or more battery cells. The method including receiving, via a central charging station, the battery; securing, via a locking mechanism, the battery to the central charging station; and charging, via the central charging station, the battery when received. The method further including receiving, from at least one selected from a group consisting of a remote device and a user-interface, an unlock command; and disengaging the locking mechanism upon receiving the unlock command.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. For ease of description, some or all of the example systems presented herein are illustrated with a single exemplar of each of its component parts. Some examples may not describe or illustrate all components of the systems. Other exemplary embodiments may include more or fewer of each of the illustrated components, may combine some components, or may include additional or alternative components. The application is capable of other embodiments and of being practiced or of being carried out in various ways.

Figure 1:
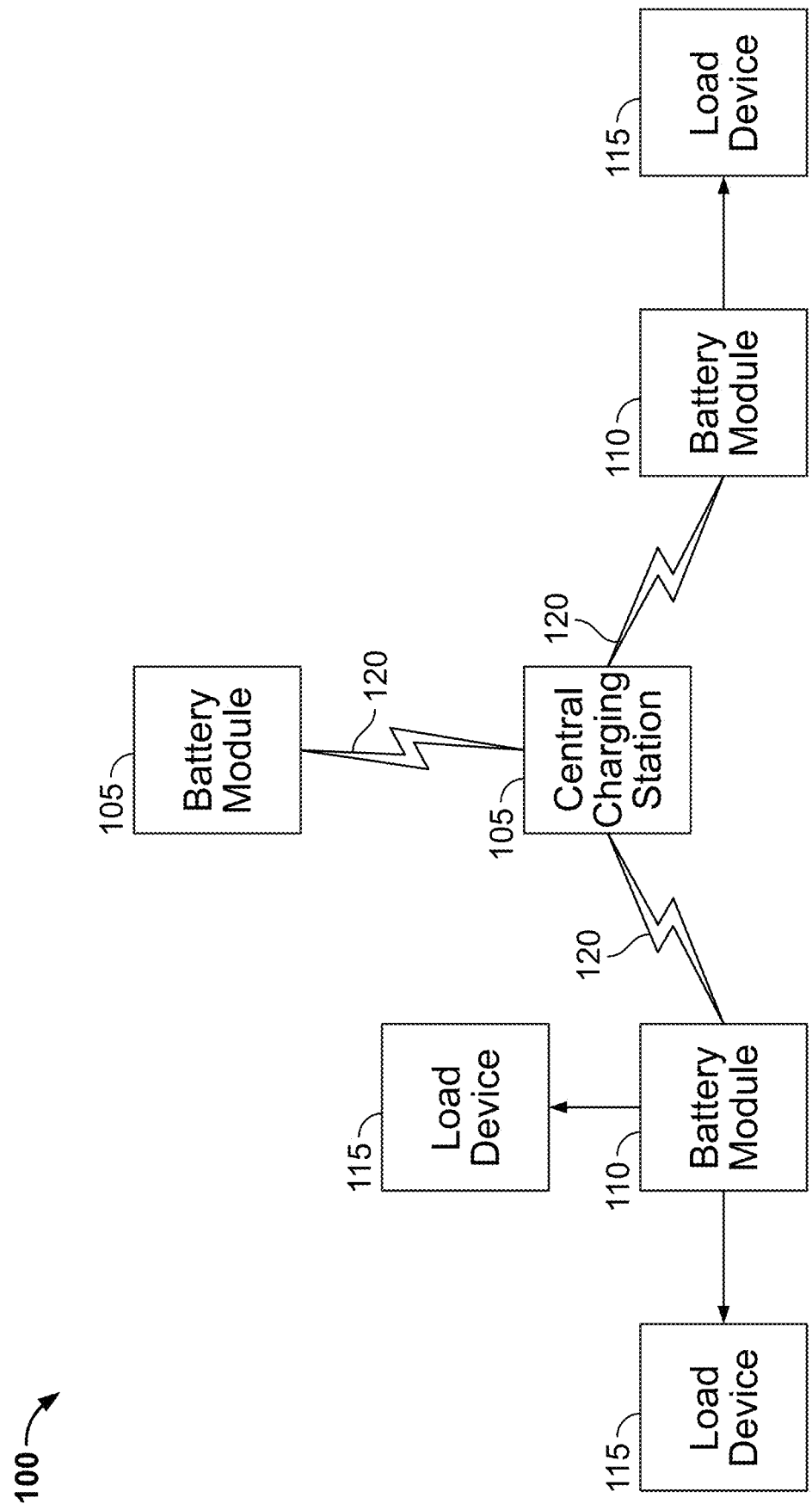
FIG. 1 illustrates a diagram of an example charging system according to some embodiments.

FIG. 1 illustrates a diagram of an example charging system 100 according to some embodiments. The charging system 100 may include a central charging station 105, one or more batteries 110, and one or more load devices 115 coupled to the one or more batteries 110. The central charging station 105 is configured to communicate with the one or more batteries 110, for example via communication links 120. As described in more detail in regard to FIGS. 4A and 4B, the central charging station 105 verifies the batteries 110 remain within a virtual boundary (or a geo-fence) proximate to the central charging station 105. The batteries 110 supply power to the one or more load devices 115 coupled to the respective battery 110 while within the virtual boundary. When the central charging station 105 determines one of the batteries 110 is outside the virtual boundary, the central charging station 105 sends a command to the battery 110 to stop powering the load devices 115 coupled to the battery 110. In other embodiments, once a battery 110 leaves the virtual boundary, the battery 110 will become non-operational (for example, prohibit the supply of power to a load device 115).

Figure 2A:
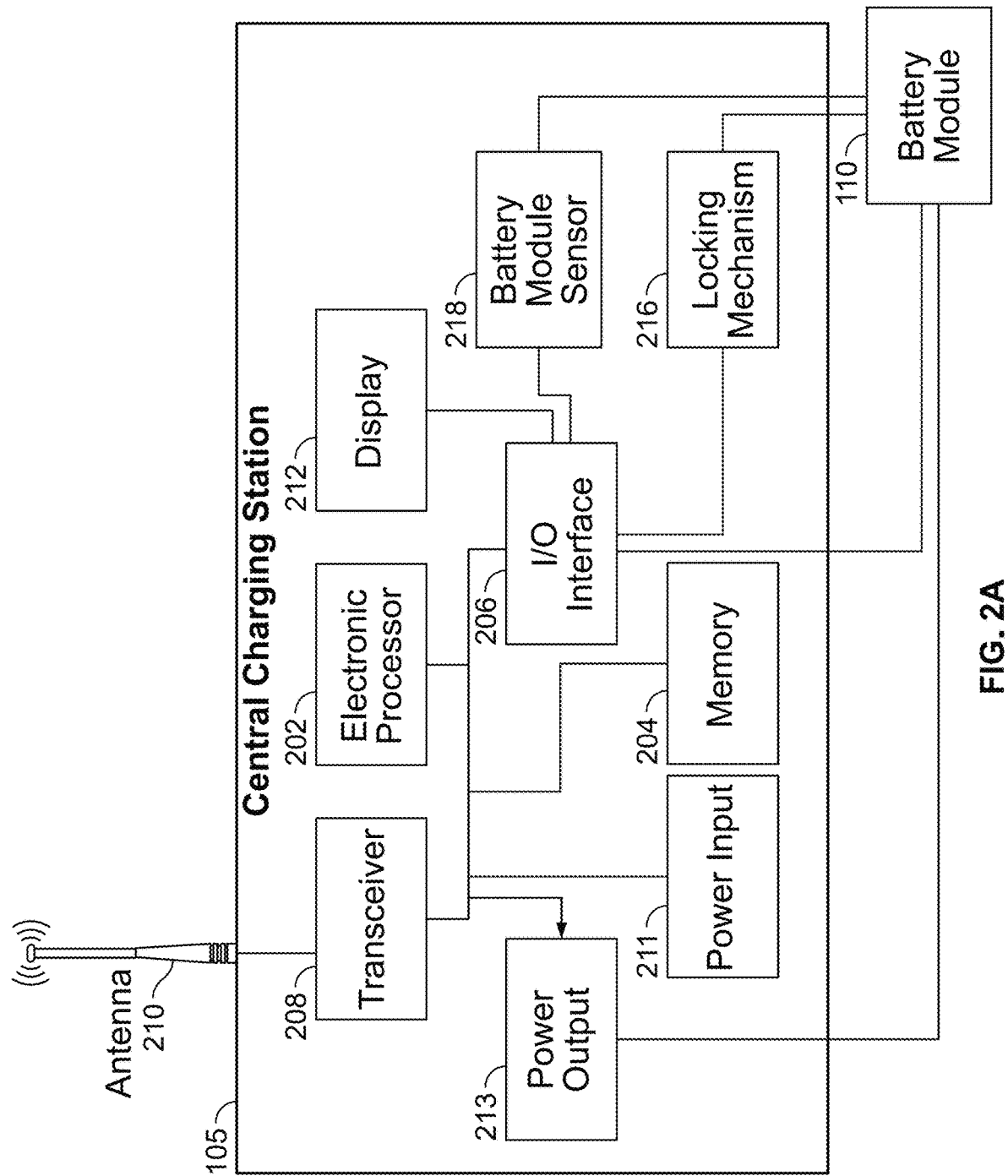
FIG. 2A illustrates a diagram of a central charging station of the charging system of FIG. 1 according to some embodiments.

FIG. 2A illustrates a diagram of the central charging station 105 according to some embodiments. In the embodiment illustrated, the central charging station 105 includes an electronic processor 202, a memory 204, an input and output (I/O) interface 206, a transceiver 208, an antenna 210, a power input 211, and a power output 213. In some embodiments, the central charging station 105 includes a display 212. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. In other constructions, the central charging station 105 includes additional, fewer, or different components. For example, in some embodiments the central charging station 105 includes one or more electronic sensors configured to sense an electric (for example, voltage, current, and/or power) and/or thermal characteristic of the central charging station 105 and/or battery(s) 110.

The electronic processor 202 obtains and provides information (for example, from the memory 204 and/or the I/O interface 206), and processes the information by executing one or more software instructions or modules, capable of being stored, for example, in a random access memory ("RAM") area of the memory 204 or a read only memory ("ROM") of the memory 204 or another non-transitory computer readable medium (not shown). The software can include firmware, one or more applications, program data, filters, rules, one or more program modules, and other executable instructions.

The memory 204 can include one or more non-transitory computer-readable media, and includes a program storage area and a data storage area. The program storage area and the data storage area can include combinations of different types of memory, as described herein. The memory 204 may include, among other things, a unique identifier for each battery 110 to be coupled to the central charging station 105. The electronic processor 202 is configured to retrieve from the memory 204 and execute, among other things, software related to the control processes and methods described herein.

The I/O interface 206 is configured to receive input and to provide output to one or more peripherals. The I/O interface 206 obtains information and signals from, and provides information and signals to, (for example, over one or more wired and/or wireless connections) devices both internal and external to the central charging station 105. In some embodiments, the I/O interface 206 may include user-actuable devices (for example, a keypad, switches, buttons, soft keys, and the like) and indictor lights/devices (for example, light emitting diodes (LEDs), haptic vibrators, and the like).

The electronic processor 202 is configured to control the transceiver 208 to transmit and receive data to and from the central charging station 105. The electronic processor 202 encodes and decodes digital data sent and received by the transceiver 208. The transceiver 208 transmits and receives radio signals to and from various wireless communications networks using the antenna 210. The electronic processor 202 and the transceiver 208 may include various digital and analog components, which for brevity are not described herein and which may be implemented in hardware, software, or a combination of both. Some embodiments include separate transmitting and receiving components, for example, a transmitter and a receiver, instead of a combined transceiver 208.

The display 212 may be any suitable display, for example, a liquid crystal display (LCD) touch screen, or an organic light-emitting diode (OLED) touch screen. The central charging station 105 may implement a graphical user interface (GUI) (for example, generated by the electronic processor 202, from instructions and data stored in the memory 204, and presented on the display 212), that enables a user to interact with the central charging station 105. The graphical user interface may allow a user to view information regarding the central charging station. Such information may include the type and charging status of the connected batteries 110 and the load devices 115 coupled to the respective batteries 110. The graphical user interface may also allow an authorized user to define and adjust the virtual boundary of the central charging station 105, install or remove additional batteries 110 to the system 100, or remotely command one or more batteries 110 to stop supplying power to or charging the load devices 115 coupled to them. The graphical user interface may allow interaction with the interface using gesture-based inputs or user-actuated switches/buttons. The graphical interface may be partially distributed on one or more additional external devices, for example a smartphone or tablet. In some embodiments, the external devices include one or more of the connected load devices 115.

The power input 211 is configured to receive an input power. In the illustrated embodiment, the power input 211 is a power plug configured to receive the input power from an electrical socket. In some embodiments, the input power is approximately 110 VAC to approximately 120 VAC. In other embodiments, the input power is approximately 210 VAC to approximately 220 VAC.

The central charging station 105 is configured to be associated with one or more batteries 110. The electronic processor 202 is configured to provide power to and communicate with the battery 110 through the I/O interface 206. The battery 110 is configured to be coupled to the central charging station 105 to be charged via a wired connection, receptacle to socket connection, or wirelessly (for example, via inductive charging). The battery 110 is also removable from the central charging station 105. When the battery 110 is removed (no longer physically coupled to the central charging station 105), the electronic processor 202 communicates wirelessly with the battery 110 via the transceiver 208.

Communication between the central charging station 105 and various components including the batteries 110 can occur through the communication links 120. In some embodiments, the communication links 120 is, for example, a wide area network (WAN), a transport control protocol/internet protocol (TCP/IP) based network, a cellular network, such as, for example, a Global System for Mobile Communications (or Groupe Special Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 1G network, a 3GSM network, a 4GSM network, a Digital Enhanced Cordless Telecommunications (DECT) network, a Digital advanced mobile phone system (AMPS) (IS-136/time division multiple access (TDMA)) network, or an Integrated Digital Enhanced Network (iDEN) network, etc.). In other embodiments, the communication links 120 is, for example, a local area network (LAN), a neighborhood area network (NAN), a home area network (HAN), or personal area network (PAN) employing any of a variety of communications protocols, such as Wi-Fi, Bluetooth, ZigBee, etc.

The central charging station 105 is configured to provide power, via power output 213, to one or more batteries 110. Although illustrated as providing power to a single battery 110, in other embodiments, the central charging station 105 is configured to provide power to two or more batteries 110. In some embodiments, the batteries 110 receive the power and charge a battery 312 (FIG. 3A), or one or more battery cells, of the battery 110. In some embodiments, the power is supplied via a proprietary charging interface. In such an embodiment, the charging interface may be wired. In other embodiments, the power is supplied via wireless power transmission (for example, inductive charging). In some embodiments, the power output port 213 may be configured to transfer power to, as well as communicate with, the one or more batteries 110. For example, in some embodiments, the power output port 213 may be configured to perform near-field communication (NFC). In further embodiments, the central charging station 105 is configured to determine and implement a charging limit on the one or more batteries 110. The charging limit may be automatically determined by the charging station 105 or set by a user. Although a single power output 213 is illustrated, it should be understood that, in some embodiments, the central charging station 105 may include more than one power output port 213. The central charging station 105 may include additional output ports (not shown) configured to provide power to and/or communicate with additional electronic devices other than the batteries 110.

In some embodiments, the central charging station 105 stores (within the memory 204) an index of unique identifiers, each identifier assigned to a battery 110. The index may be updated (identifiers may be added or removed) via the user interface on the display 212, a wireless electronic command from a remote device via the transceiver 208, and/or the I/O interface of the central charging station 105. The central charging station 105 may be configured to, upon receiving a battery 110, receive an identifier associated with the battery 110 from the battery 110 and refer to the index to determine if the identifier is stored within the memory 204. When the identifier is not found in the index, the central charging station 105 may generate an alert, for example on the display 212, that an unknown battery 110 has been received. In further embodiments, the central charging station 105 may be configured to transmit the alert, including the identifier, to another central charging station.

In some embodiments, the central charging station 105 includes one or more cavities (for example, cavities 214 in FIG. 2B) configured to hold the one or more batteries 110 while they are charging/coupled to the central charging station 105. In some embodiments, the one or more cavities 214 extrude from the central charging station 105. In further embodiments, the one or more cavities 214 may be recessed in the central charging station 105. The one or more batteries 110 and cavities 214 may be configured to be modular so that the battery(s) 110 fit securely into the respective cavity 214.

Figure 5:
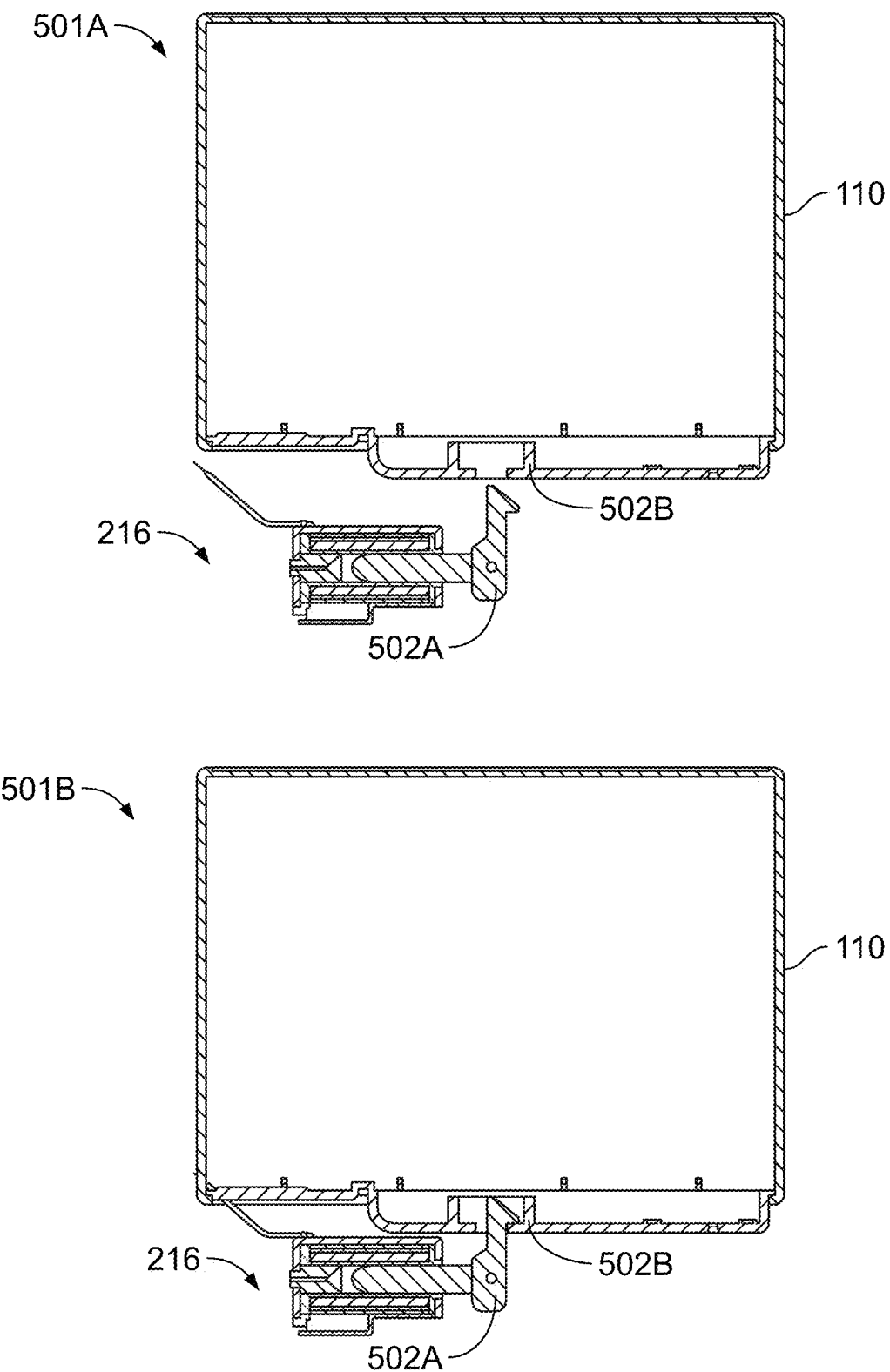
FIG. 5 is a side cutaway view illustrating a locking mechanism of the battery of FIGS. 3A & 3B according to some embodiments.

The central charging station 105 may include one or more locking (or latching) mechanisms 216 configured to secure the batteries 110 to the central charging station 105. FIG. 5 is a side cutaway view illustrating an exemplary embodiment of the locking mechanism 216 with the battery 110. The locking mechanism 216 includes a locking member 502A configured to engage with a receiver cavity 502B of the battery 110. When in an unlocked position 501A, the locking member 502A is not engaged with the receiver cavity 502B, allowing the battery 110 to be removed from the central charging station 105. When in a locked position 501B, the locking member 502A is engaged with the receiver cavity 502B so that the battery 110 is secured and not removable from the central charging station 105. It should be understood that the locking mechanism 216 may utilize other kinds of locking/latching configurations besides the illustrated embodiment. In some embodiments, the battery 110 includes the locking member 502A while the central charging station 105 includes the receiver cavity 502B.

The locking mechanisms 216 may be configured to be electronically locked, where the locking mechanism 216 is operated (locked and unlocked) electronically or remotely (for example, "smart locked"). When the locking mechanisms 216 are configured to be electronically locked, they may be operated via electronic commands from a user interaction through the graphic user interface on the display 212, an input device of the input and output interface 206, and/or an electronic command from a remote device (for example, a smart phone, tablet, computer, or other personal electronic device) received via the transceiver 208. In some embodiments, the locking mechanisms 216 may be configured to be physically engaged (required to be manually locked and unlocked via a key, a turn of a knob, or the activation of a user-actuable device in order to be operated). In some embodiments the locking mechanism 216 may utilize more than one kind of locking/latching configuration.

For example, in some embodiments, the locking mechanism 216 may be configured to both physically and electronically lock, wherein, when the locking mechanism 216 is configured to override/bypass the electronic lock when physically engaged, allowing a user to unlatch one or more of the batteries 110 without an electronic command.

Returning to FIG. 2A, in some embodiments, the central charging station 105 may include a battery sensor 218 in (or proximate to) each of the power output port 213 (for example, within each cavity 214). The battery sensor 218 is configured to sense when one or more of the batteries 110 is present/coupled to the central charging station 105. The battery sensor 218 may be used in addition to the wireless and/or wired communication (for example, via the transceiver 208 and the I/O interface 206 and/or power output 213 respectively) between the charging station 105 and the battery(s) 110 as a separate means of determining when the battery(s) 110 is placed in the charging station 105. For example, the battery sensor 218 may be configured to read an identification label/chip (for example, a radio-frequency identification or RFID chip) of the battery 110. This secondary communication may be used by the central charging station 105 to determine if there is an issue/malfunction with the wireless/wired communication between the central charging station 105 and the battery(s) 110.

Figure 2B:
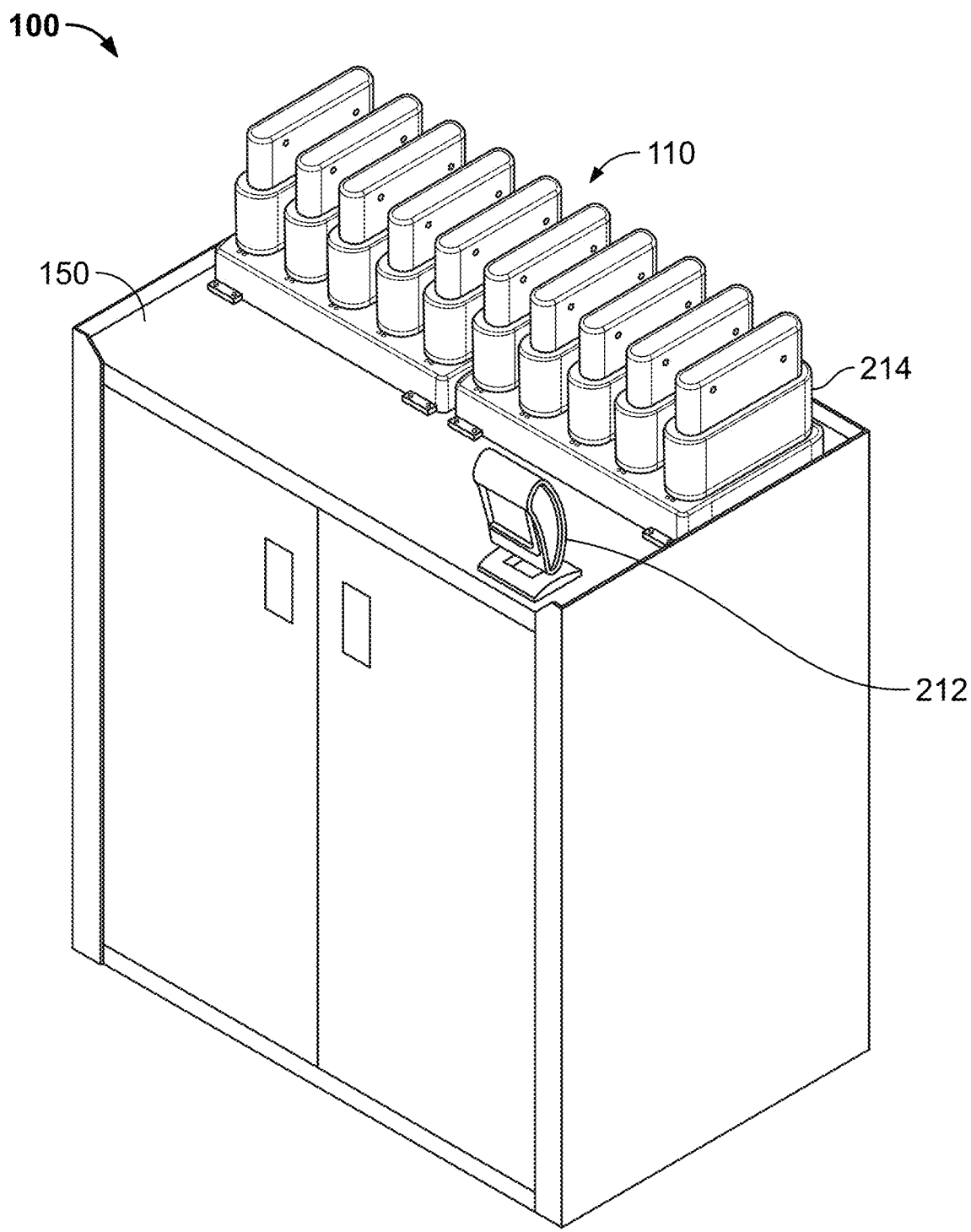
FIG. 2B illustrated a front perspective of the central charging station of FIG. 2A according to some embodiments.

FIG. 2B illustrates an exemplary embodiment of the system 100 including the central charging station 105 and the batteries 110. In the illustrated embodiment, the charging station 105 is configured as a cabinet. It should be understood that other configurations of the charging station 105 are realizable. The charging station 105 may be configured to be mounted/secured to a vertical or horizontal surface or be integrated into a stand-alone structure. For example, the charging station 105 may be integrated into a stanchion, a portable cart, a table, and the like.

Figure 3A:
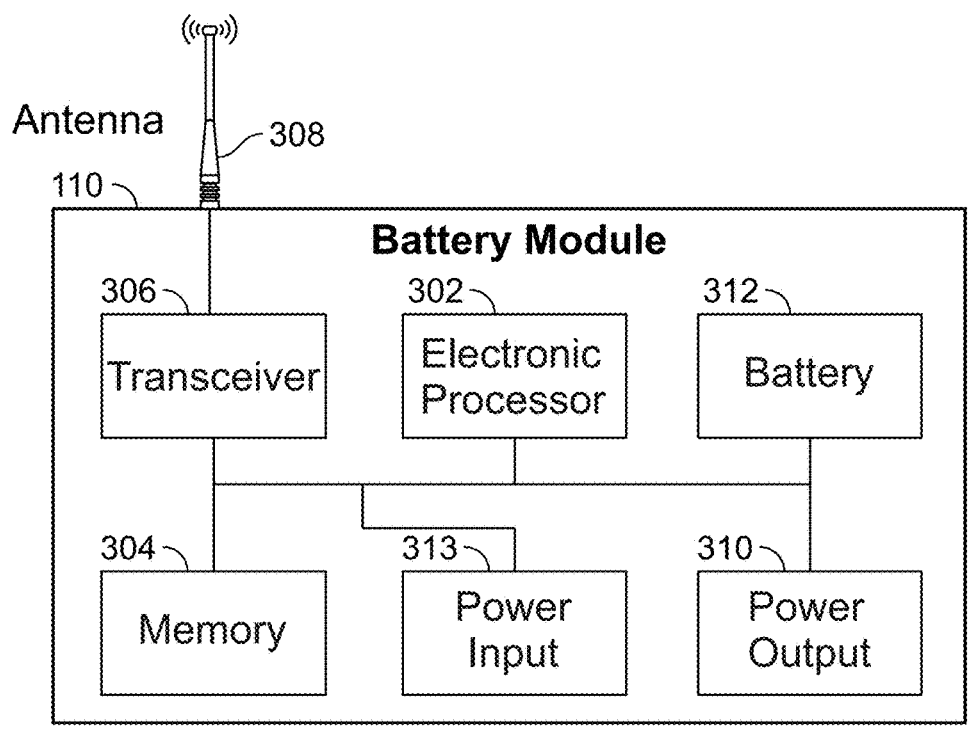
FIG. 3A illustrates a diagram of a battery of the charging system of FIG. 1 according to some embodiments.

FIG. 3A illustrates a block diagram of the battery 110 of the central charging station 105. The battery 110 includes an electronic processor 302, a memory 304, a transceiver 306, an antenna 308, at least one power output 310, a battery 312, and a power input 313.

The power output 310 is configured to connect/couple to one of the load devices 115 to supply power. In some embodiments, the power output 310 is configured to receive a power plug. Although only one power output 310 is illustrated, it should be understood that in some embodiments the battery 110 includes more than one power output 310. In such embodiments, the power outputs 310 are similar power receptacles configured to output similar types of power, while in other embodiments, power outputs 310 are different power receptacles configured to output power of different types or having different characteristics (for example, different voltage amplitudes and/or magnitudes, different voltage frequencies, alternating current, or direct current). For example, one power output 310 is a direct current power receptacle configured to output power having approximately 12 VDC, a second power output 310 is a North American power receptacle configured to output power having approximately 120 VAC, and the third power output 310 is a Universal Serial Bus (USB) power output configured to output approximately 5 VDC. However, in other embodiments, the power outputs may be different. In other embodiments, the battery 110 may be configured to wirelessly charge one or more of the load devices 115, for example via inductive charging.

In some embodiments, the battery 110 may be configured to electronically communicate (via the transceiver 306 and/or via the power output(s) 310) with one or more load devices 115 coupled to the battery 110. In some embodiments, the battery 110 is configured to notify (for example, ping) the central charging station 105 repeatedly after a predetermined amount of time. The battery 110 may use the information to approximate the distance that the battery 110 is from the central charging station 105.

In some embodiments the battery 110 further includes one or more of a rectifier, alternator, or other converter. The rectifier and/or alternator are configured to convert the power from the battery to an appropriate output power to be output to the one or more load device 115.

As discussed above with respect to central charging station 105, the battery 110 is configured to receive power from the central charging station 105 via the power input 313. In some embodiments, the battery 110 may include charging circuitry to receive the power from the central charging station 105 and charge the battery 312. In some embodiments, the power input 313 may be a wireless charging coil configured to wirelessly receive power and/or communicate with the central charging station 105. As mentioned above, in further embodiments, one or more of the at least one output port 310 may be a wireless charging coil configured to wirelessly transmit power to the load device(s) 115. In some embodiments, the power output 310 and power input 313 may be integrated into a single bi-directional port (or coil) configured to both transmit and receive power to and from the charging station 105 and the load device(s) 115.

The battery 110 may include one or more input/output components (not shown) similar to those described above in regard to the I/O interface 206. In some embodiments, the battery 110 is configured to generate a visual and/or audible alert to indicate a particular operational status. Such operational statuses may include a detected fault within the battery 110, the battery 312 is low on charge, or the battery 110 is outside the virtual boundary and has stopped supplying power to the load device 115. A visual indication may be provided via one or more light-emitting diodes (LEDs), a display (not illustrated), or an alarm. In some embodiments, the battery 110 may be configured to forward information regarding the particular condition to one or more external devices, for example the load device 115 or the central charging station 105.

In some embodiments, the battery 110 includes more than one battery 312. In further embodiments, the battery 110 may be configured to allow additional batteries 312, or battery cells, to be added or removed from the battery 110. In such embodiments, the battery 110 may further include a secure panel (not shown) to prevent unauthorized removal of the batteries 312. In some embodiments, the central charging station 105 is configured to monitor an electric charge curve (an electric and/or thermal characteristic profile over time) via one or more electronic sensors (not shown) during charging of the battery 312. The central charging station 105 may be configured to record and store the charging pattern of the battery 312 of the battery 110 while coupled to the charging station 105. The central charging station 105 may be further configured to analyze the charging pattern for any indications of potential malfunction in the battery 110. When an indication is determined to be present, the central charging station 105 may generate a visual and/or audible alert indicating the battery 110 indicating the potential malfunction. In some embodiments, when a potential malfunction is determined to be present in the battery 110, the central charging station 105 may keep the locking mechanism 216 engaged so that the battery 110 cannot be removed unless an authorized personnel clears the alert.

Authorization of removal of the battery 110 may be validated via the graphic user interface of the display 212 or an input device of the I/O interface 206. In some embodiments, an electric charge curve may be recorded and stored by the battery 110 while the battery 110 is charging one or more load devices 115. The battery 110 may transmit the electric charge curve to the central charging station 105 for, for example, monitoring usage and/or monitoring for potential maintenance. In some embodiments, the central charging station 105 may use the curve information from the battery 110 to determine the amount of usage of the battery from the time the battery 110 was removed from the central charging station to when the battery 110 was returned. The charging station 105 may then calculate a price to charge a user of the battery 110 based on the amount of usage.

Figure 3B:
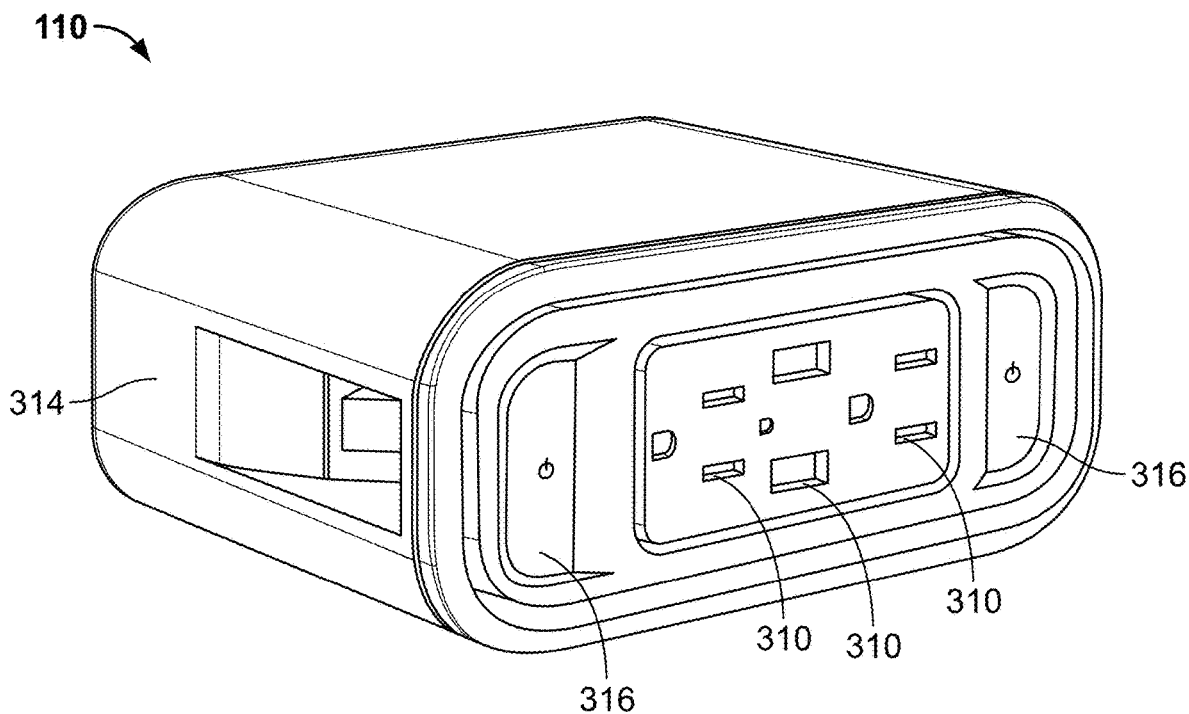
FIG. 3B illustrates a front perspective of the battery of FIG. 3A according to some embodiments.

FIG. 3B illustrates an exemplary embodiment of the battery 110. The battery 110 includes a housing 314 encasing the components described above in regard to FIG. 3A and includes multiple power outputs 310. As illustrated, in some embodiments, the battery 110 includes one or more light sources 316 to indicate to a user an operational status of the battery 110. It should be noted that, in some embodiments, the battery 110 may include additional communication ports/coils to communicate with other electronic devices. In further embodiments, the battery 110 may include a mounting bracket or clip (not shown) so that it may be attached/hung from a surface.

Figure 4A:
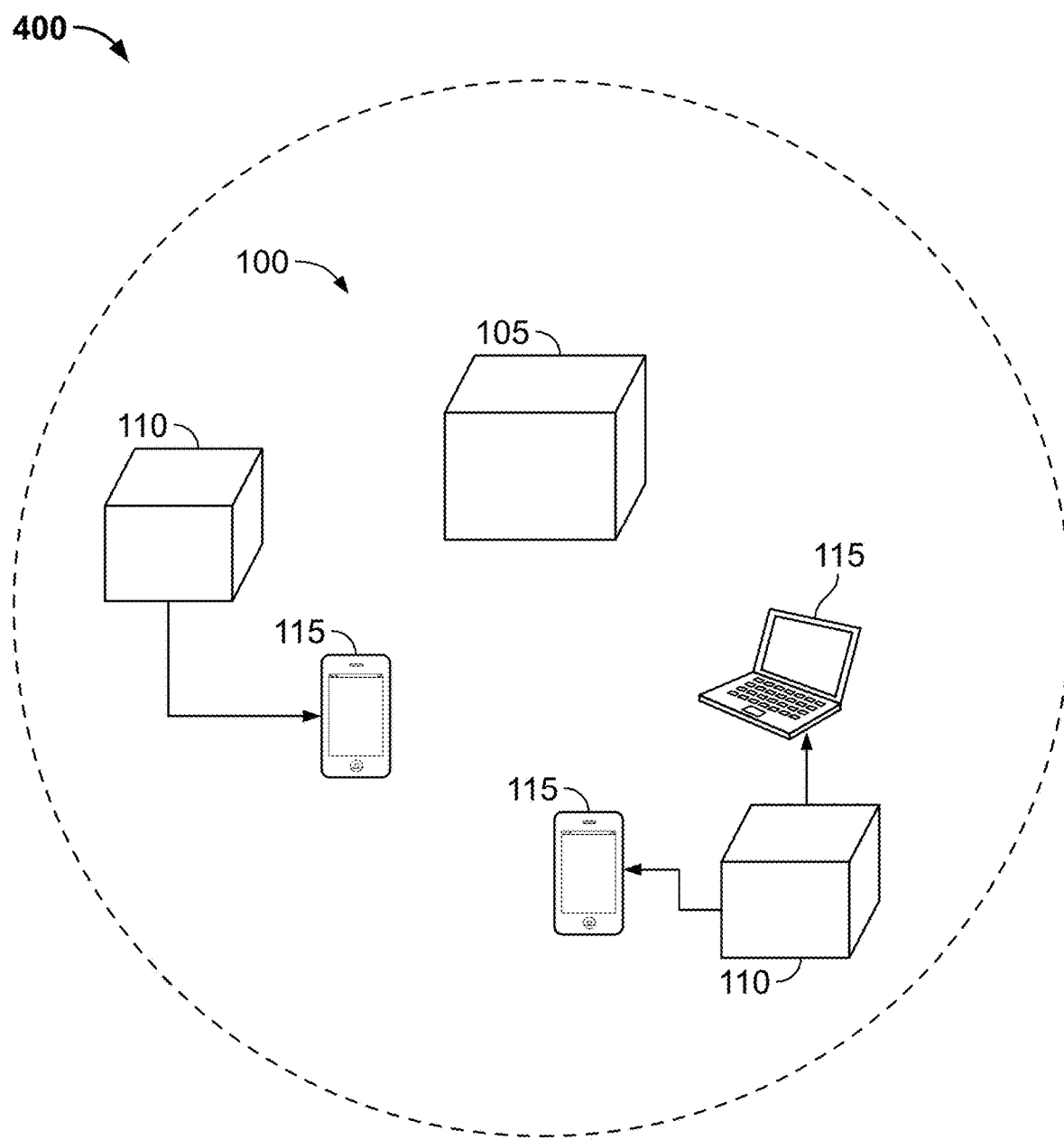
FIGS. 4A & 4B illustrate a diagram of a battery asset management application system for the charging system of FIG. 1.
Figure 4B:
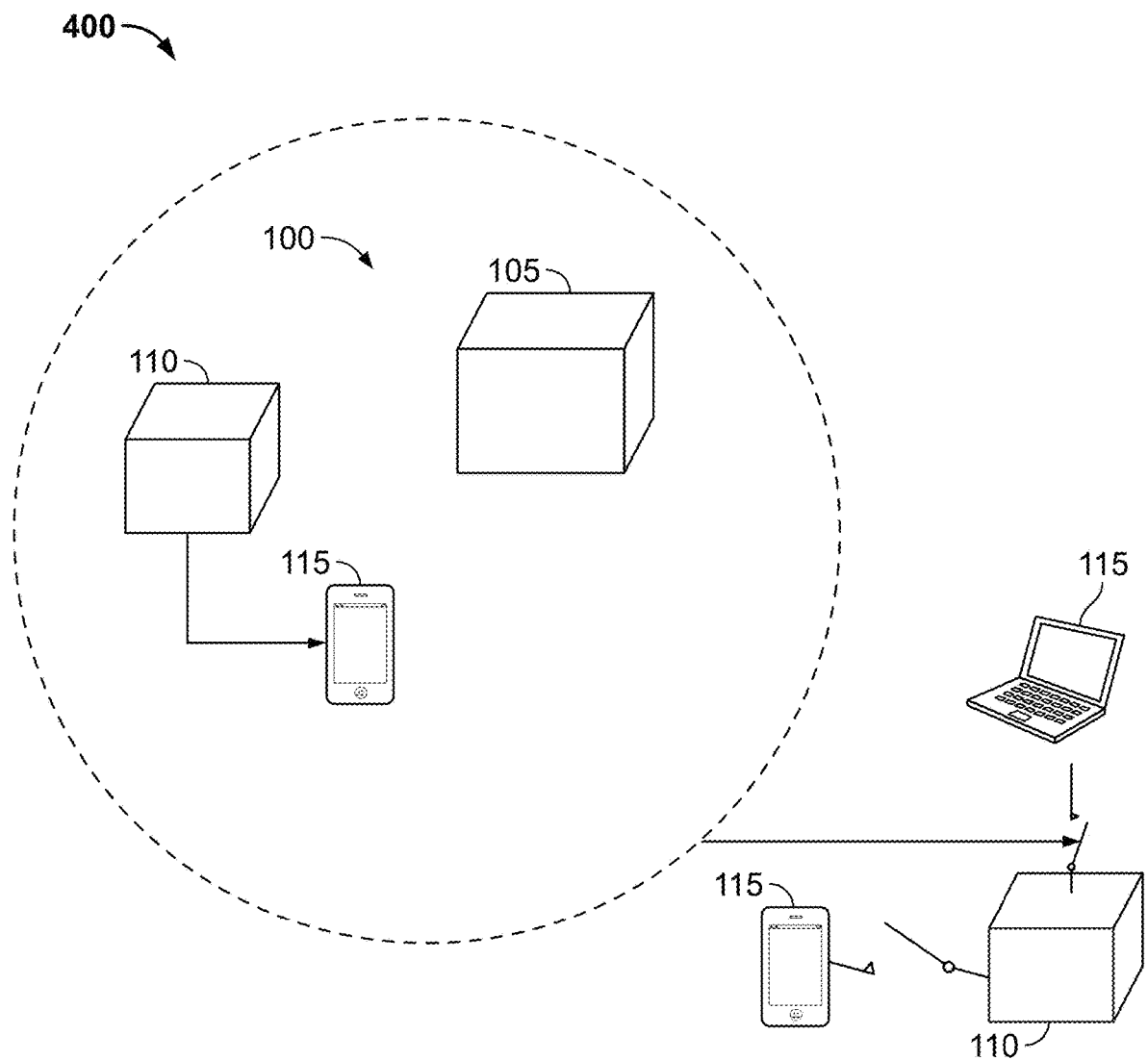

FIGS. 4A and 4B illustrate an example virtual boundary 400 of the charging system 100. The virtual boundary 400, or geofence, is a virtual boundary superimposed on an area. The area may be the area surrounding the central charging station 105 or an area proximate to the central charging station 105. The configuration of the virtual boundary 400, for example the shape or the size, may be predefined or defined by a user via, for example, the user interface.

The central charging station 105 determines whether one or more of the batteries 110 are within the virtual boundary 400. In some embodiments, the central charging station 105 is configured to collect information based on monitoring the location and status of each of the batteries 110. The location of the batteries 110 may be determined via proximity sensors (not illustrated) or radio frequency communication, for example Bluetooth or radio frequency identification (RFID). In some embodiments, the batteries 110 are tracked using, among other things, satellite navigation tracking (e.g., global navigation satellite system (GNSS) tracking, global positioning system (GPS) tracking, Galileo tracking, Indian Regional Navigation Satellite System (IRNSS) tracking, GLObal NAvigation System (GLONAS) tracking, BeiDou Navigation Satellite System, etc.) and WiFi-based tracking. In some embodiments, the batteries 110 transmit information regarding their location to the central charging station 105.

While the battery 110 is within the virtual boundary 400, the battery 110 is operable to provide power to charge the one or more load devices 115 connected to the battery 110. However, as illustrated in FIG. 4B, when one of the batteries 110 leaves or is outside of the virtual boundary 400, the battery 110 prohibits power to the load devices 115 it is connected to.

In some embodiments, the central charging station 105 is configured to wirelessly charge the one or more batteries 110 while the batteries 110 are within a predetermined charging range of the central charging station 105. The batteries 110, while within this predetermined charging range, may then be wirelessly charged while charging one or more of the connected load devices 115. The predetermined charging range may be the same as or less than the range of the virtual boundary 400. For example, when the charging system 100 is located in a room within a commercial building, the virtual boundary 400 may be defined to encompass the entire commercial building while the predetermined charging range is limited to a single room within the commercial building. When this is the case, a user with the battery 110 is able to charge or power a load device 115 as well as the battery 110 while within the single room of the commercial building. When the user takes the battery 110 outside the single room, leaving the predetermined charging range, the battery 110 no longer receives a wireless charge from the central charging station 105. However, the user is still able to use the battery 110 to supply power to the one or more load devices 115.

In some embodiments, the battery 110 is configured to periodically determine an approximate distance the battery 110 is from the central charging station 105. For example, the battery 110 may periodically ping the central charging station 105 and use the information to approximate the distance of the battery 110 from the central charging station 105. In further embodiments, the battery 110 may use the approximate distance to determine when the battery 110 is outside the virtual boundary 400. The battery 110 may then provide a visual/audible indication to the user to notify that they are outside the virtual boundary 400 and/or notify the central charging station 105 that the battery 110 is outside the virtual boundary 400. In some embodiments, the battery 110 is configured to cease providing power/charging the load device(s) 115 when the battery 110 determines that the battery 110 is outside the virtual boundary. The battery 110 may continue to approximate the distance from the central charging station 105 and continue providing power/charging the load device(s) 115 when the battery 110 determines that the battery 110 is within the virtual boundary 400 again. In further embodiments, the battery 110 is configured to stop powering/charging the load device(s) 115 and/or shut off after failing to receive a response from the charging station 105 after sending one or more ping requests.

In the foregoing specification, specific embodiments have been described. However, one of ordinary skill in the art appreciates that various modifications and changes can be made without departing from the scope of the application as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The application is defined solely by the appended claims including any amendments made during the pendency of this application and all equivalents of those claims as issued.

Moreover in this document, relational terms for example first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") for example microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Thus, the application provides, among other things, a system and method of device charging. Various features and advantages of the application are set forth in the following claims.

What is claimed is:

1. A device charging system comprising:
a battery configured to supply a type of power to at least one load device; and
a central charging station configured to
receive the battery,
lock the battery via a locking mechanism,
receive, via the battery, a signal indicative of an electric charge curve,
determine, based on the electric charge curve, an amount of usage of the battery, calculate, based on the amount of usage of the battery, a price to charge a user of the battery;
generate an alert upon determining a potential malfunction; and
unlock the battery upon the alert being cleared.

2. The device charging system of claim 1, wherein the load device is at least one selected from a group consisting of a smart phone, a tablet, and a computer.

3. The device charging system of claim 1, wherein the amount of usage of the battery is determined based on when the battery was removed from the central charging station.

4. The device charging system of claim 1, wherein the type of power supplied to the at least one load device is transferred wirelessly.

5. The device charging system of claim 1, wherein the battery is configured to supply a second type of power to a second load device.

6. The device charging system of claim 5, wherein the second type of power is different from the type of power supplied to the at least one load device.

7. The device charging system of claim 1, wherein the central charging station is further configured to supply power to the battery via a proprietary charging interface.

8. The device charging system of claim 1, wherein the central charging station is further configured to determine a potential malfunction in the battery by monitoring an electronic charge characteristic of the battery while the battery is being charged and, when the potential malfunction is determined to exist, generate an alert to a user of the device charging system.

9. A method of managing a battery having one or more battery cells and a receiver cavity, the method comprising:
receiving, via a central charging station, the battery;
charging, via the central charging station, the battery;
allowing, from the central charging station, removal of the battery by a user;
receiving, via the central charging station and from the battery, a signal indicative of an electric charge curve;
determining, via the central charging station and based on the electric charge curve, an amount of usage of the battery;
calculating, via the central charging station and based on the amount of usage of the battery, a price to charge a user of the battery; and
locking, via a locking mechanism, the battery to the central charging station;
generating an alert upon determining a potential malfunction; and
unlocking the battery upon the alert being cleared.

10. The method of claim 9, further comprising:
supplying, via the battery, a type of power to a load device;
wherein the load device is at least one selected from a group consisting of a smart phone, a tablet, and a computer.

11. The method of claim 9, wherein the type of power supplied to the at least one load device is transferred wirelessly.

12. The method of claim 9, wherein the step of charging the battery includes using a proprietary charging interface.

13. The method of claim 9, further comprising:
monitoring an electrical characteristic of the battery;
determining a potential malfunction in the battery; and
when the potential malfunction is determined to exist, generate an alert to a user of the device charging system.

14. The method of claim 9, wherein the amount of usage of the battery is determined based on when the battery was removed from the central charging station.

* * * * *